Jan. 22, 1946. E. H. J. PHILLIPS 2,393,337
INSTRUMENT LANDING SYSTEM
Filed Oct. 1, 1941 3 Sheets-Sheet 2
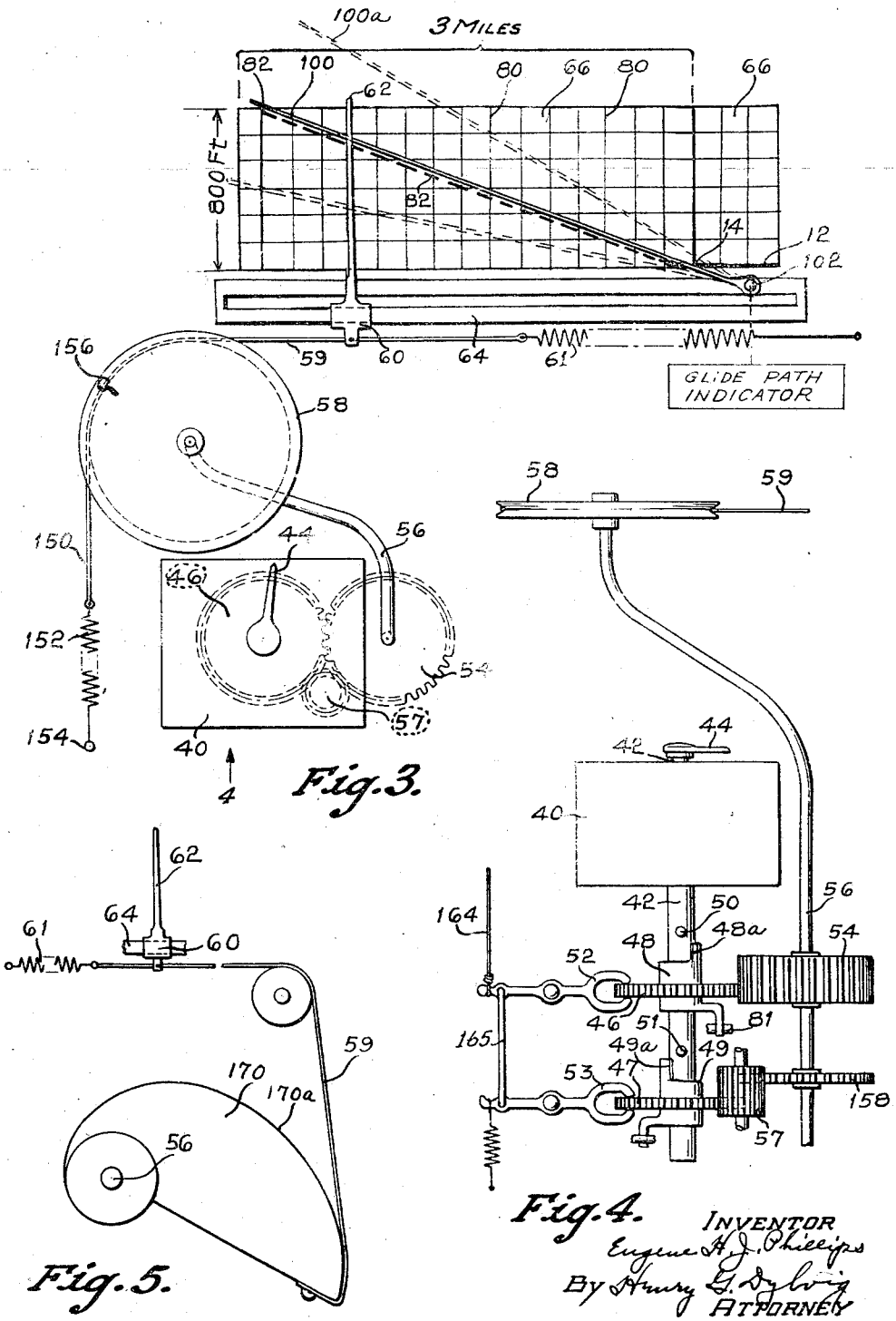

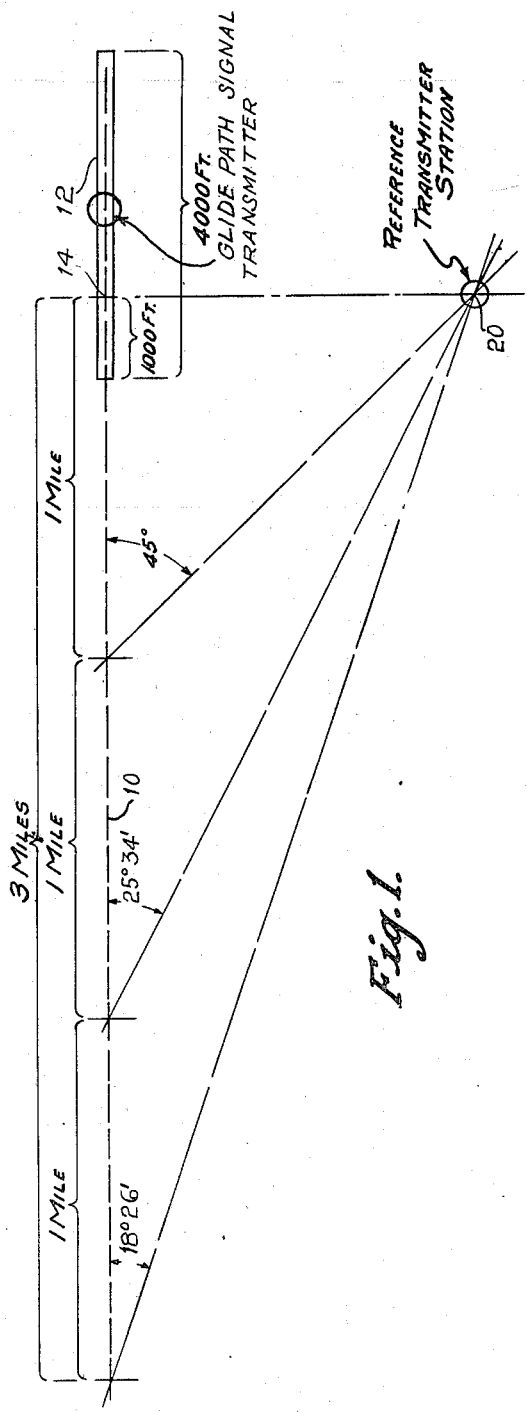
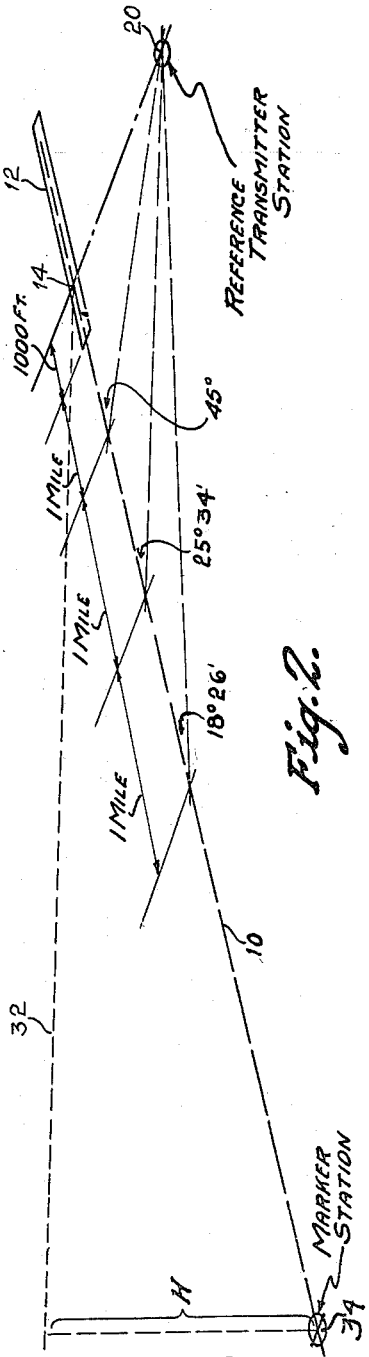

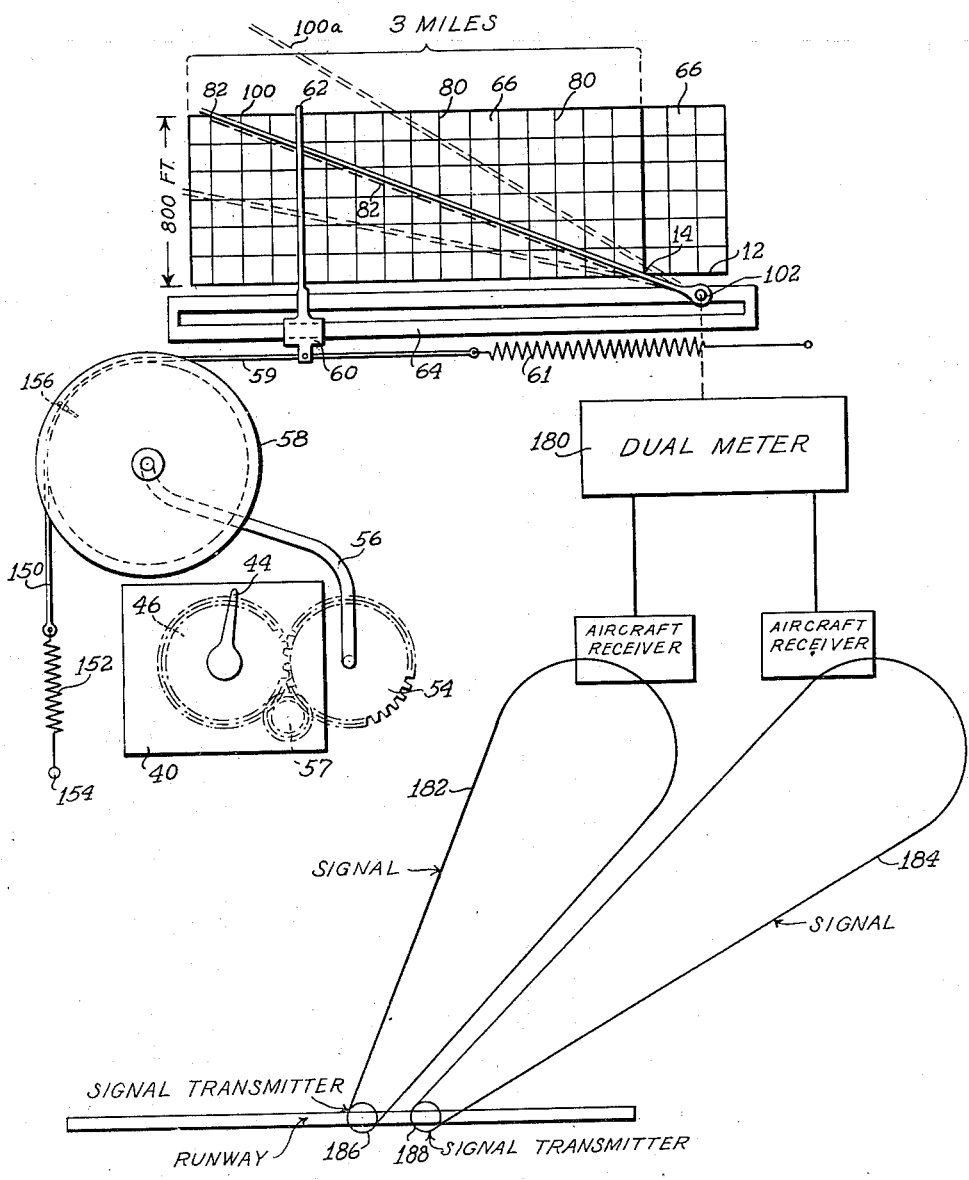

Patented Jan. 22, 1946

2,393,337

UNITED STATES PATENT OFFICE 2,393,337

INSTRUMENT LANDING SYSTEM

Eugene H. J. Phillips, Fort Worth, Tex.

Application October 1, 1941, Serial No. 413,137

10 Claims. (Cl. 250—11)

This invention relates to a landing system and more particularly to a landing system wherein sufficient information is made available to the pilot to determine his relative position with respect to the runway while in the vicinity of the landing field.

An object of this invention is to provide an instrument landing system whereby the pilot while in the vicinity of the landing field is at all times apprised of the distance of the aircraft from the contact area of the runway.

Another object of this invention is to provide a visual indication system for use in connection with instrument landing, which system utilizes conventional equipment now in general use, which equipment may be slightly modified to meet changed conditions.

Another object of this invention is to utilize a visual indication system in connection with instrument landing, wherein a reference transmission station is offset from the localizer course, which reference station is used to designate the distance of the aircraft from the contact point on the runway.

Another object of this invention is to provide an instrument landing system that is economically produced, that utilizes standard parts that are light in weight, and one that is dependable and easily interpreted.

Another object of this invention is to provide an instrument landing system utilizing a radio direction finder for indicating the distance of the aircraft from the near end of the runway.

Another object of this invention is to incorporate the use of a radio glide path with an offset reference transmission station for indicating the relative altitude and the distance of the aircraft from the point of contact on the runway.

Another object of this invention is to measure the distance from an aircraft flying on a localizer course to the runway by utilizing the deflection of a direction finding instrument as a meter.

Another object of this invention is to provide a visual chart wherein two indicants are mounted in intersecting relation, one of which is responsive to the relative position with respect to the glide path and the other is responsive to the relative position of a reference station.

Another object of this invention is to utilize a reference station for indicating the relative position of an aircraft with respect to the end of the runway, which position may be indicated both as to altitude and as to distance.

Another object of this invention is to reproduce all of the flight information required by the pilot on one or two instruments, such information as air speed, heading, altitude, distance from runway, relative position of runway and direction of runway, so that it will not be necessary for the pilot to inspect each instrument separately.

Another object of this invention is to provide a clutch mechanism for interconnecting the automatic radio direction finder with a distance metering device, such that the distance metering device is out of engagement until the aircraft is within a predetermined distance from the near end of the runway.

Another object of this invention is to provide mechanism for interconnecting the automatic radio direction finding instrument having a rotary movement to a mechanism for translating this movement into a linear movement, which linear movement may be proportional to the rotary movement or it may be changed such that unequal increments of rotary movements representing a predetermined unit distance result in equal linear movements.

Other objects and advantages reside in the construction of parts, the combination thereof and the mode of operation, as will become more apparent from the following description.

In the drawings,

Figure 1 discloses a schematic showing of a runway, a localizer course and the reference transmitting station.

Figure 2 discloses a perspective view of the runway, the reference transmitting station, a marker station and a glide path.

Figure 3 discloses a top plan view of an automatic radio direction finding device having associated therewith a clutch mechanism, a device for translating rotary movement into linear movement, and a visual scale mounted in association with an indicant for indicating the longitudinal position of the aircraft with respect to the runway and a second indicant for indicating the glide path of the aircraft.

Figure 4 is a side elevational view of a portion of the device disclosed in Figure 3.

Figure 5 is a schematic showing of a cam mechanism used in translating unequal increments of rotary movement into equal increments of linear movements or vice versa.

Figure 6 discloses a schematic diagram of the preferred embodiment of a glide path landing system.

In the past, numerous attempts have been made to provide instrument landing equipment. Thus far most of this equipment may be referred to as being in the experimental stage, in that none of it supplies the necessary or desirable information to the pilot to make a perfect landing under all conditions at all times. Too much is left to the imagination and the good judgment of the pilot.

In my copending application Serial No. 399,856, filed June 26, 1941, for Aircraft landing system, I disclose a system and the necessary equipment for supplying the requisite information to the pilot. However, this system requires a considerable quantity of radio devices and other electrical appliances.

In the system disclosed herein, no attempt has been made to develop a system utilizing entirely new equipment; but instead, the navigation instruments now in commercial use or fully developed, as the case may be, are utilized with slight modification in furnishing the pilot the necessary information. Minor changes and attachments may be made to this standard equipment, so as to better present the necessary information to the pilot.

The aircraft now in use by air lines, the navy and the army may include the necessary equipment to follow a localizer course, an automatic radio direction finder, altimeters, either absolute or barometric, and sometimes instruments for following a glide path. The instruments used in connection with the localizer course permit the pilot to follow a straight line and if the localizer course is aligned with the runway, the pilot can direct the airplane directly above the runway. Markers may be used along the course so as to signal the pilot when passing over predetermined points. In the past, one marker has been placed three miles from the air field. Another marker has been placed one-half mile from the end of the runway.

In the system disclosed herein, markers may be placed along the localizer course a suitable distance from the field. However, instead of placing a marker one-half mile from the end of the runway, a marker is offset from the localizer course. When the aircraft approaches the field, the automatic radio direction finder may be tuned to the offset marker, hereinafter referred to as the reference transmitting station, to definitely determine the distance the aircraft is from the contact point of the runway. The contact point is generally 1000 feet beyond the approach end of the runway. This is a matter of choice. The automatic radio direction finder may be graduated or may be linked to suitable indicating devices, so that the pilot at a glance may determine the distance the aircraft is from the contact point of the runway, as will appear more fully from the detailed description that follows.

The aircraft is preferably provided with the necessary equipment for following a localizer course, an automatic radio direction finder and a suitable altimeter. These devices have not been shown for the reason that these devices are well known to those skilled in the art.

The system disclosed herein in addition to utilizing equipment in the aircraft, also utilizes ground equipment which includes a localizer, which has not been shown, defining a localizer course 10 aligned with the runway 12. A contact point 14 of the runway is arranged in suitable spaced relation from the approach end of the runway, as for example, 1000 feet. A reference transmitting station 20 is preferably located on a line intersecting the contact point on the runway and extending in a direction normal to the longitudinal axis of the runway. This may be positioned any suitable distance from the longitudinal axis of the runway. For the purpose of illustration, the reference transmitting station has been located one mile from the runway. It may be placed to the right or to the left of the runway.

The reference transmitting station generates and transmits a comparatively low frequency signal, preferably modulated with a suitable identifying signal. This identifying signal may be a code signal or it may be an audio signal. Although a low frequency signal is suggested for use in the reference transmitting station, this system is not limited to any particular radio frequency. It may be a low radio frequency, it may be an intermediate frequency or a frequency in the domestic broadcast band.

The ideal glide path has been shown in Figure 2 by the dotted line 32. For some purposes the ideal glide path forms an angle of 3° with the horizontal. As the aircraft approaches the landing field, the pilot may receive instructions from the ground as to the particular runway to be used in the direction of approach. Upon receiving these instructions, the pilot preferably heads his aircraft towards the marker 34 shown in Figure 2, several miles away from the end of the runway, where the pilot may turn his aircraft so as to align it in the proper direction with respect to the localizer course aligned with the selected runway. If, for example, it is desirable to follow a 3° angle glide path and the pilot desires to descend from a height of 1500 feet, the marker 34 should be some over five miles from the contact point of the runway, that is, the normal intersection of a straight line 3° glide path at 1500 feet altitude will be a distance of some over five miles. The pilot follows the localizer course descending at a suitable rate until he is a suitable distance from the end of the runway, probably about five miles away, when he begins to use his automatic radio direction finder in the aircraft for indicating the distance of the contact point of the runway. He does this by tuning the automatic radio direction finder to the frequency of the reference transmitting station. At a distance of three miles, the automatic radio direction finder will be deflected 18° 26' from the direction of flight charted by the localizer course. When the pointer of the automatic radio direction finder is deflected 18° 26' from the localizer course, the pilot knows that he is approximately 3 miles from the contact point of the runway. As the aircraft approaches the runway, the pointer of the direction finder will be deflected further and further from the localizer course. When it is deflected 25° 34', the pilot knows he is 2 miles from the contact point of the runway. When the pointer is deflected 45°, the aircraft is one mile from the contact point. During the last mile of the approach to the contact point of the runway, the pointer on the automatic radio direction finder will swing through 45°, that is, from the 45° position to the 90° position. This results in very accurate readings being available when the aircraft approaches the runway. This is a very desirable feature. Furthermore, due to the fact that the pointer of the automatic radio direction finder is substantially at right angles with respect to the localizer course, as the aircraft approaches the contact point of the runway, any deviation from the localizer course by the aircraft will not be reflected in the readings found on the direction finder.

Generally, the automatic radio direction finder dial is placed off the floor between the pilot and the co-pilot. This is an inconvenient place for observing the relative distance of the aircraft from the contact point of the runway during landing operations. That being the case, and in order to translate angular displacements into linear movements and to translate glide path signals into indications of absolute altitude, an attachment is preferably provided for the automatic radio direction finder, such that the readings indicated by the automatic radio direction finder are directly in front of the pilot and instead of the readings appearing on a circular dial, the deflections of the automatic radio direction finder are preferably translated into linear movement. Such a mechanism is disclosed in Figures 3 and 4.

In these figures the automatic radio direction finder 40 has been shown schematically. The shaft 42 carries on one end the conventional pointer 44. The opposite end of the shaft 42 projects through the bottom of the casing and has mounted thereon a pair of gears 46 and 47. The gears 46 and 47 are mounted on tubular sleeves 48 and 49. These are provided with shoulders 48a and 49a adapted to engage pins 50 and 51 respectively, which are fixedly mounted in the shaft 42. Suitable clutch mechanism, including bifurcated yoke members 52 and 53 actuated by a common member 164 through a connecting link 165, is used for moving the gears and their respective sleeves along the axis of the shaft 42.

When the gears are in the "up" position shown in the drawings, movement is transmitted by the shaft 42 to the gears. When these gears are raised on the shaft, as viewed in Figure 4, one of the pins will engage one of the shoulders. If the station is located to the right of the runway, one pin engages the corresponding shoulder in due course. If the reference transmitting station is located on the other side of the runway, the other pin will engage its corresponding shoulder. The gear 46 meshes directly with a wide gear 54 fixedly attached to a flexible shaft 56. The gear 47 meshes with a wide pinion 57 meshing with a gear 158 also fixedly attached to the shaft 56. If the pin 50 engages the shoulder 48a, motion is transmitted by the shaft 42 to the shaft 56 through the gears 46 and 54, in which event the shaft 42 will rotate in a direction opposite to the direction of rotation of the shaft 56. If the station is located on the other side of the runway so as to cause the shaft 42 to rotate in the opposite direction, the pin 51 will engage the shoulder 49a. In this event, the pin 50 will rotate away from the shoulder 48a. When the pin 51 engages the shoulder 49a, the gear 47 meshes with the pinion 57, which in turn meshes with the gear 158 to rotate the shaft 56 in the same direction as the direction of rotation of the shaft 42. By this arrangement, the shaft 56 rotates in the same direction irrespective of which side the reference transmitting station is located from the runway.

Gears having no back lash are preferably used to eliminate errors in measured distances. The particular clutch and gear arrangements have merely been shown for the purpose of illustration. Any other suitable drive mechanism may be used, which drive may be mechanical, electrical or hydraulic.

In the event the automatic radio direction finder should rotate through much more than 90°, a suitable mechanism is preferably provided for releasing the clutch mechanism. Suitable mechanism to return the parts to the home position in readiness for the next landing operation will be described more fully later. This is to provide for trial flights prior to actual landing and to provide for contingencies when an aircraft may be passing over a landing field without intention of landing on the field, the pilot merely making use of the reference transmitting station in definitely locating his relative position.

The shaft 56 supports a grooved pulley 58 connected to a cable 59, spring urged in a clockwise direction by a suitable tension spring 61, as clearly shown in Figure 3. The cable 59 is preferably fixedly connected to a slide 60 provided with a pointer or indicant 62. This slide 60 is preferably guided on a suitable track 64, extending parallel to a visual chart or graph 66. It can be readily seen that as the direction finder 40 is deflected from the direction of flight, the shaft 42 rotates the gear 46 or the gear 47, meshing either directly or indirectly with the gears 54, or 158, driving the flexible shaft 56, fixedly attached to the grooved pulley 58, connected to the cable 59, actuating the indicant 62. The flexible cable and the pointer have been shown for the purpose of illustration. In actual practice a more positive actuating mechanism is preferably used, as for example, a gear and ratchet drive mechanism, provided with the necessary anti-back lash mechanism.

As the attachment for measuring the distance from the contact point of the runway is only used when in the vicinity of the runway, automatic means, not shown, have been provided for disconnecting this attachment from driving connection with respect to the shaft 42. The end 150 of the cable 59 extending beyond the grooved pulley 58 is connected to a helical spring 152 fixedly attached at 154 for returning the indicant, the pulley and the parts associated therewith to the original or starting position whenever the clutch mechanism is released. The cable 59 is anchored at 156 to the pulley 58. This automatically actuates the parts in readiness for the succeeding operation. Whenever the gears are disconnected from the shaft 42, the sleeve 48 will engage a stop 81, that holds the sleeve 48, together with the parts associated therewith, in readiness for the succeeding landing operation.

The visual chart 66 is preferably mounted on the instrument board in front of the pilot. This visual chart is provided with a plurality of vertically disposed lines 80, for indicating the distance from the contact point of the runway 12, shown by a heavy line in the lower right hand corner. This visual chart is preferably provided with a dotted line 82 representing the ideal glide path. If no radio glide path equipment is available, the pilot loses altitude by the use of the altimeter, attempting to maintain altitudes corresponding to the altitudes designated by the intersection of the indicant 62 and the dotted line 82 shown on the visual chart 66.

This equipment may be adapted to be used with conventional glide paths. At present two types of glide paths have been developed, or partially developed. One of these is generally referred to as a constant intensity glide path. The other is referred to as the equal intensity glide path, usually obtained by use of two micro wave frequencies. The former seems to have reached the higher state of development at the present time. It consists of ultra high frequency signals generated from a single transmission source and radiated by means of directional antennas, so that the signals are propagated in a pattern having very decidedly directional characteristics. This system, with the present equipment, results in a substantially straight glide path from the contact point of the runway to a distance approximately three miles from this point.

Referring to Figure 2, such a glide path has been indicated by the dotted line 32. When the aircraft through its ultra high frequency radio receiver picks up the signal approximately three miles from the contact point of the runway at an altitude H, depending entirely upon the glide angle, the pilot endeavors to follow the path where the signal output of the radio receiver remains constant. This output may be measured on a suitable meter having an indicant 100 mounted for pivotal movement about a pivot 102, as shown in Figure 3. This indicant 100 overlies the visual chart 66 and is positioned underneath the indicant 62. On the visual chart is shown a heavy dotted line 82, which indicates the normal glide path. When the pilot is descending in the proper glide path, as designated by the constant intensity glide path readings, the indicant 100 will register with the dotted line 82. The point where the indicant 62 overlies, or so to speak, intersects the indicant 100, represents the absolute altitude reading measured with respect to the runway at the particular location of the aircraft. If the aircraft is at the proper elevation, as indicated by the glide path, this point is found on the heavy dotted line 82 directly underneath the indicant 62. If the intensity is increased, the indicant 100 raises, as shown, for the purpose of illustration, by the dotted line position 100a, thereby indicating an altitude higher than the altitude designated by the portion of the dotted line 82 underlying the indicant 62. If the aircraft is flying low, the indicant 100 drops below the dotted line 82, indicating to the pilot that he is flying low. Any deviation of the indicant from the dotted line 82 indicates to the pilot that he is off of the glide path. Furthermore, it gives him an approximately correct indication of the distance he is off of the normal glide path. At first glance, it may appear as though such were not the case, for the reason that the indicant 100 pivots about the pivot 102. That would indicate a very low reading when the aircraft is nearly ready to land, an extremely high reading when he is two or three miles away from the contact point of the runway; but the characteristic of the signals is such throughout the pattern that a slight deviation from the course near the contact point of the runway results in a great change in intensity of the signal, thereby causing the indicant to deflect very rapidly; but due to the short effective length of the pointer 100, it will indicate a small distance by a small deviation from the charted course near the contact point of the runway. When the aircraft is three miles from the contact point of the runway, the signal is fanned out into such a wide pattern that a considerable distance off the regular course results in a comparatively small change in intensity reading on the meter; but at this point the entire length of the indicant 100 is used, so that a small change in intensity in signal will cause the outer end of the indicant to swing through a comparatively large arc.

If an equal intensity glide path is used, then a dual meter 180 will be incorporated for indicating the relative position with respect to the equal intensity field or glide path. This equal intensity glide path is obtained by generating two microwave patterns 182 and 184 by the transmitters 186 and 188 shown schematically in Figure 6, one below and one above the glide path, it being necessary for the pilot to follow a course between the two patterns, such that the intensity of the signals received upon the two radio receivers 190 and 192 from the two patterns is of equal intensity. In this case the indicant 100 is responsive to the two signals influencing the dual meter 180 shown schematically in Figure 6.

From the foregoing it is clear that the localizer course is preferable to an instrument landing system. In certain cases when emergency steps must be taken to quickly establish landing facilities on temporary airdromes, such as airdromes in foreign territories in time of war, a portable localizer station may be used. On the other hand, the radio glide path is not necessarily essential to instrument landing. It is a very decided convenience to the pilot, in that it links into the use of this system to great advantage. When the glide path is available, it instantaneously interprets the absolute altitude on the visual chart 66, where the relative position of the aircraft with respect to the glide path as far as altitude is concerned is shown by the indicant 100, and the actual position of the aircraft with respect to the distance from the contact point of the runway is shown by the indicant 62. In the absence of a radio glide path, this system affords the pilot the opportunity of a continuous check of an artificial glide line established by the rate of descent and his altimeter in connection with the instantaneous indication of the ideal absolute altitude shown on the visual chart by means of the relative position of the indicant 62 with respect to the ideal glide path line 82.

The absolute altitude may be obtained with the use of a glide path either with or without the reference transmitting station. In the absence of a reference transmitting station, the distance from the contact point of the runway may be measured by a phase shift of signals, as clearly shown and described in my copending application Serial No. 399,856, filed June 26, 1941, for Aircraft landing system. If a glide path is available, this glide path may be used for ascertaining the absolute altitude of the aircraft with respect to some point on the ground, providing the pilot knows the exact distance from his aircraft to this point on the ground. This distance may be measured by the reference transmitting station, as described above, it may be measured by a phase shift of signals or it may be measured in any other suitable manner. The mode of measuring the distance is immaterial as far as indicating the altitude from the glide path is concerned.

This system may be conveniently associated with an automatic device for piloting the aircraft and adapted to be shifted so as to automatically land the plane when in suitable position for landing. The system shown herein may serve as a check to the pilot that the automatic landing system is functioning properly. In the event the indicant starts to rise or starts to drop, it is a signal to the pilot that the automatic landing system is not functioning properly.

From an inspection of the angles shown for one, two and three miles, it can readily be seen that the angular displacement is not uniform within a three mile range. In order to obtain a uniform angular displacement, the cable 59 may be actuated by a cam 170 shown in Figure 5, wherein the cam surface 170a has varying radii of curvature. By this arrangement, it is possible to obtain various types of relative movement between the indicant 62 and the rotation of the shaft 56. By utilizing an extremely long radius of curvature when the aircraft is three miles out from the contact point and then gradually decreasing the radius of curvature as the aircraft approaches the point of contact, it is possible to maintain a uniform linear movement of the indicant 62.

The devices disclosed herein have been shown merely for the purpose of illustration, without any intention of limitation. The system disclosed herein may be used with various types of instruments, utilizing a great variety of frequencies, depending entirely upon the purpose to which the system is to be put and the available facilities.

"Fan-shaped pattern" as used herein, has been used to designate a very decided directional signal that is generated from a point gradually spreading so as to have a conical or funnel-shaped contour, which has been referred to for convenience as "fan-shaped." The longitudinal cross sectional area of this pattern has lobular lines of constant intensity. These intensities vary, so as to have a family of a substantially infinite number of lobes, one within the other.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An instrument landing system for use in landing an aircraft upon the runway of a landing field, said system including means associated with the runway for transmitting radio signals, said means including a transmitting station positioned to one side of the runway, means in the aircraft for receiving said radio signals, said means including a direction finder for interpreting the signals to measure the distance from the aircraft to the runway, means associated with the runway for generating a glide path signal, means responsive to the intensity of the glide path signal, said last mentioned means being located in the aircraft for indicating the relative direction of approach of the aircraft with respect to the runway, and means for indicating the altitude of the aircraft, said last mentioned means utilizing the distance of the aircraft from the runway and the intensity of the glide path signal for indicating altitude.

2. An instrument landing system for use in landing an aircraft upon the runway of a landing field, said system including means offset from the longitudinal axis of the runway for transmitting radio signals, means including a direction finder in the aircraft for indicating the distance of the aircraft flying in aligned relation with respect to the runway, said means measuring the angle of displacement of the radio signals generated by the first mentioned means, means associated with the runway for generating a glide path signal having a predetermined pattern, means in the aircraft, said last mentioned means being responsive to the intensity of the glide path pattern for indicating the relative direction of approach of the aircraft with respect to the runway, and means for indicating the altitude of the aircraft, said last mentioned means utilizing the distance of the aircraft from the runway and the intensity of the glide path signal for indicating the altitude.

3. A system for measuring the altitude of an aircraft with respect to a reference point on the ground, said system including means for generating a glide path signal in predetermined relation with respect to the reference point on the ground, means in the aircraft for measuring the intensity of the glide path signal, and distance measuring means for measuring the distance of the aircraft from the reference point, said distance measuring means including a transmitting station located to one side of the line of flight through the reference point, and a direction finding device for indicating the angular displacement of the reference point to thereby determine the altitude by the intensity of the glide path signal and the distance from the reference point.

4. An attachment for an automatic radio direction finder, said attachment including means for translating rotary movements into linear movements, a clutch for releasably interconnecting said means to the radio direction finder, said means including an indicant having reciprocatory movement, and a visual chart underlying the indicant, said visual chart being graduated both horizontally and vertically so as to have graduations extending parallel to the indicant.

5. An attachment for an automatic radio direction finder, said attachment including means for translating rotary movements into linear movements, a clutch for releasably interconnecting said means to the automatic radio direction finder, said means including an indicant having reciprocatory movement, and means for automatically actuating the first mentioned means into a predetermined position whenever the clutch is released.

6. An attachment for an automatic radio direction finder, said attachment including means for translating rotary movements into linear movements, a clutch for releasably interconnecting said means to the automatic radio direction finder, said means including an indicant having reciprocatory movement, a chart underlying the indicant, said chart being provided with a plurality of vertically disposed lines to indicate the distance from the contact point of the runway shown by a heavy line, and means for adjusting the indicant into a predetermined position upon release of the clutch to re-set said indicant.

7. A metering device for use in an aircraft following a glide path consisting of ultra high frequency signals propagated in one direction so as to generate a fan-shaped pattern, said metering device including a pivotally mounted indicant swinging about the pivot through an angular displacement proportionate to the change in intensity of the signal, a stationary chart underlying the indicant, and means for shifting the position at which the readings of the indicant with respect to the stationary chart are taken so as to take the readings of the deflections of the indicant in a position corresponding to the rate of change of the intensity of the signal in the zone of the aircraft.

8. A metering device for use in an aircraft following a glide path consisting of ultra high frequency signals propagated in one direction so as to generate a fan-shaped pattern, said metering device including a pivotally mounted indicant swinging about the pivot through an angular displacement proportionate to the change in intensity of the signal, a calibrated chart underlying the indicant, a transmitting station offset from the direction of flight, and means including a direction finder responding to the offset transmitting station for designating the portion of the chart corresponding to the rate of change of the intensity of the signal in the zone of the aircraft.

9. In a system of instrument landing utilizing an ultra high frequency signal generating a fan-shaped pattern, the combination of means in the aircraft responding to changes in the intensity of the signal of the glide path for shifting the course of the aircraft so as to cause the aircraft to follow a path of constant intensity with means for visually indicating upon a common chart to the pilot the relative position of the aircraft with respect to the contact point of the runway.

10. In a system of instrument landing utilizing an ultra high frequency signal generating a fan-shaped pattern, the combination including automatic means responding to the glide path signal for directing the aircraft to the runway, a radio receiver in the aircraft for measuring the intensity of the glide path signal and means for measuring the distance from the aircraft to the contact point of the runway, said last mentioned means cooperating with the intensity measuring radio receiver to visually indicate upon a common chart the relative position of the aircraft with respect to the runway.

EUGENE H. J. PHILLIPS.